March 4, 1969   D. W. ROPER   3,430,519

DIFFERENTIAL WITH TEMPERATURE COMPENSATING CLUTCH

Filed Jan. 17, 1967

INVENTOR.
DANIEL W. ROPER
BY Yount, Raney, Flynn, & Tarolli
ATTORNEYS

United States Patent Office 3,430,519
Patented Mar. 4, 1969

3,430,519
DIFFERENTIAL WITH TEMPERATURE
COMPENSATING CLUTCH
Daniel W. Roper, Rochester, Mich., assignor to Eaton
Yale & Towne Inc., Cleveland, Ohio, a corporation
of Ohio
Filed Jan. 17, 1967, Ser. No. 609,932
U.S. Cl. 74—711                          14 Claims
Int. Cl. F16h 1/44

ABSTRACT OF THE DISCLOSURE

This application discloses a differential wherein a clutch is operative to drivingly connect the differential gear carrier with one of the side gears of the differential in response to relative rotation therebetween. The clutch is actuated to drivingly connect the carrier and side gear by a viscous shear fluid coupling which acts in opposition to a bimetal spring which resists actuation of the clutch by the viscous shear coupling.

---

The present invention relates to a drive mechanism having relatively rotatable drive members and a clutch associated with the members and operable when actuated to retard relative rotation between the drive members.

A principal object of the present invention is the provision of a new and improved drive mechanism including driving and driven members and a clutch means for drivingly connecting the members, and wherein the clutch means is actuated to drivingly connect the members by an actuating means which acts against a disengaging force provided by a spring biasing means, and which disengaging force varies in response to variations in temperature to compensate for changes in the actuating force resulting from such temperature variations so that the driving and driven members are drivingly connected at substantially the same predetermined speed of relative rotation therebetween regardless of temperature.

Another object of the present invention is the provision of a new and improved drive mechanism as set forth in the next preceding paragraph wherein the spring biasing means includes a spring detent-like structure including a spring constructed from dissimilar materials which have different coefficients of thermal expansion.

Another object of the present invention is the provision of a new and improved drive mechanism, as set forth in the next preceding paragraph, wherein the spring member is connected to the clutch means and includes parts which cooperate with one of the driving or driven members to provide the detent-like structure and wherein the materials of the spring are arranged such that the disengaging force provided by the biasing means decreases as temperature ambient thereto increases.

A still further object of the present invention is the provision of a new and improved drive mechanism including driving and driven members, a clutch between the members including a plurality of roller-like elements and a carrier therefor and with the carrier and elements movable between a position wherein the driving and driven members are free to rotate relative to each other and a position wherein the members are drivingly connected, actuating means for moving the carrier and elements to the second mentioned position, and spring detent means for urging the carrier and elements toward the first mentioned position including an arcuate spring member attached to the carrier and cooperable with an adjacent peripheral portion of one of the driving and driven members to urge the carrier and elements against movement by the actuating means.

Other objects and advantages of the present invention will become apparent from a consideration of the detailed description of a preferred embodiment thereof which follows and from the drawings which form a part of the specification and wherein.

Figure 1:
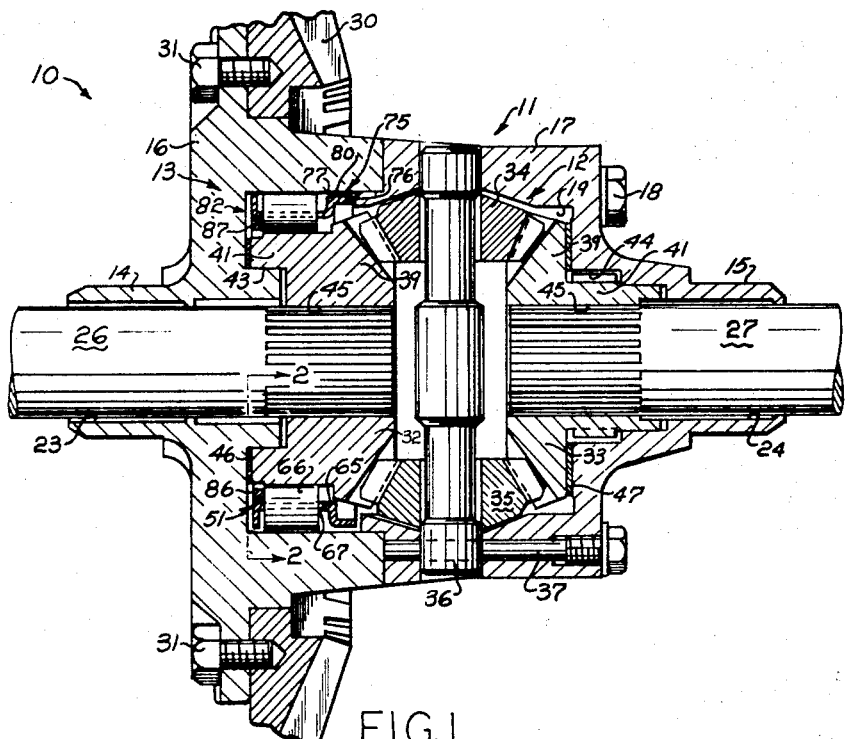
FIG. 1 is an axial sectional view of a drive mechanism embodying the present invention.

The present invention provides an improved drive mechanism having relatively rotatable driving and driven members and clutch means for drivingly connecting the members in response to relative rotation therebetween. As representing the preferred embodiment of the present invention, a differential drive mechanism 10 is illustrated in FIG. 1. The differential drive mechanism 10 is especially suitable for use in driving the wheels of a vehicle and comprises, in general, a rotatable planet gear carrier 11, a differential gear train 12, and a clutch mechanism 13 operable to retard rotation of one of the gears of the gear train 12 relative to the planet gear carrier 11.

The planet gear carrier 11 includes a pair of support portions 14 and 15 adapted to be received in bearings of a supporting structure, such as an axle housing, not shown, by which the carrier 11 is rotatably supported. The carrier 11 includes a pair of members 16 and 17 which are secured together by suitable means such as screws 18, only one of which is shown, and which members define a chamber 19 in which the gear train 12 and the clutch means 13 are located. The support portions 14, 15 of the planet gear carrier 11 are formed at opposite ends thereof and are provided with openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means which are here represented by axle shafts 26, 27, respectively, whose outer ends are connected to traction wheels, or the like, not shown, and whose inner or adjacent ends are connected to the gear train 12, as will be described hereinbelow.

The differential mechanism 10 includes a conventional ring gear 30 extending around and mounted on the carrier 11 by means of connecting screws 31 which extend through a flange which form a part of the planet carrier 11. A suitable drive pinion, not shown, meshes with the ring gear 30 and represents the power input means for the differential mechanism 10 and upon rotation effects rotation of the ring gear 30 and the planet carrier 11.

The gear train 12 is operable to transmit the rotary motion of the planet carrier 11 to the output shafts 26, 27. The gear train 12 comprises a pair of beveled type side gears 32, 33, and beveled pinion planetary gears, in this case two such gears, 34, 35 disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured to the casing by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle values coming within the usual range of such values. The side gears 32, 33, while in the preferred embodiment, comprises bevel gears, may take other known forms and each of the gears 32, 33 comprises an annular body 39 having teeth formed thereon and a central hollow sleeve or hub 41 connected to the body and extending coaxially with the axis of rotation of the side gears. The carrier 11 is provided with hollow annular or axial sockets 43, 44 into which the hub portions 41 of the gears 32, 33, respectively, extend and which rotatably receive the gears. The gears 32, 33 are provided with splines 45 in the hub openings thereof which are engaged by corresponding splines formed on the inner ends of the axle shafts 26, 27, respectively, for drivingly connecting said shafts with the side gears. Thrust washers 46, 47 are interposed between the carrier 11 and the side gears 32, 33 to absorb axial thrust of the side gears as well as to control backlash between the side and pinion gears.

The clutch means 13 is a double overrunning clutch operable to retard relative rotation of the side gear 32 with respect to the planet carrier 11. From the above, it should be apparent that the planet carrier 11 comprises a driving member and the side gear 32 comprises a driven member. The clutch means 13 is operable to drivingly connect these members. More specifically, the clutch means 13 drivingly locks or interconnects the planet carrier 11 and side gears 32. The clutch means 13 acts between the planet carrier and the hub portion 41 of the side gear 32. The outer periphery of the hub portion 41 is composed of a plurality of V-shaped grooves 60 which are spaced annularly apart therearound, extend axially along the hub portion 41, and are of only a slight depth.

The clutch means 13 includes a roller cage mechanism 51 which comprises a shiftable roller cage, or carrier, 65 and a plurality of rollers 66, supported by the shiftable roller cage 65, corresponding in number to the number of V-shaped grooves 60 on the hub portion 41. The rollers 66 engage side of the V-shaped grooves 60 on the hub portion 41 and are located in openings 67 in the roller cage 65. The openings 67 are dimensioned so as to permit the rollers 66 to be freely rotatable and radially shiftable relative to the cage member and yet prevent circumferentail movement of the rollers relative to the cage member. Shifting movement of the roller cage simultaneously moves the rollers circumferentially relative to the hub portion.

The roller cage mechanism 51 is shiftable or movable, as noted above, from a position shown in FIG. 2 wherein the rollers 66 permit relative rotation between the side gear 32 and the planet carrier 11, to a position wherein the rollers 66 are wedgingly engaged between side surfaces of the grooves 60 and a cylindrical surface 70 forming the inner periphery of the differential housing member 16 to drivingly connect the carrier 11 and side gear 32 and thereby lock up the differential mechanism.

The clutch means 13 is associated with actuating means for moving the rollers 66 to their engaged positions between the surfaces of the V-groove 60 and the surface 70 of the carrier 11 in response to a predetermined speed of relative rotation between the carrier 11 and the side gear 32 and which actuating means comprises a viscous coupling mechanism generally designated 75. The viscous coupling mechanism 75 includes an annular flange portion 76 of the cage member 65 which extends axially of the side gear and away from the rollers 66 and which has an annular outer periphery 77 which lies adjacent an annular surface 80 formed on the interior of the planet carrier 11. The surfaces 77, 80 form a viscous shear space therebetween in which a viscous shear fluid is located and which functions as a drive connection between the carrier 11 and the cage member 65.

Upon a predetermined speed of relative rotation of the planet carrier 11 relative to the side gear 32 the driving force provided by the shear fluid of the viscous coupling 75 effects a circumferential shifting movement of the roller cage mechanism 51 relative to the side gear so that the clutch means 13 drivingly connects the carrier 11 and side gear 32. More specifically, the shifting force provided by the viscous coupling 75 effects movement of the roller cage 65 and the rollers 66, carried thereby, into driving engagement between the surfaces of the grooves 60 and the surface 70 of the casing 11.

It should be apparent that as temperature ambient to the mechanism 10 changes, the viscosity of the viscous shear fluid contained therein changes accordingly, tending to change the shifting force exerted on the roller cage mechanism 51 by the viscous coupling 75 in response to a given speed of relative rotation between the carrier 11 and side gear 32. More specifically, if temperature increases, the viscosity of the shear fluid decreases and the force exerted on the roller cage mechanism by the viscous coupling decreases for a given speed of relative rotation between the members, while temperature decreases cause the force exerted on the roller cage mechanism 51 to be relatively large at the given speed of relative rotation between the members. Additionally it should be recognized that the temperature of the viscous shear fluid, and therefore its viscosity, varies during operation of the vehicle.

In accordance with the present invention, the drive mechanism 10 includes means 82 for yieldably maintaining the roller cage mechanism 51 in its centered or disengaged position and which means 82 is effective to bias the roller cage against movement from its disengaged position by the viscous shear actuating means 75. In the illustrated and preferred embodiment the means 82 is operative to provide a force which urges the rollers 66 and the roller cage 65 to their disengaged position and includes a spring detent-like arrangement comprising springs 86, 87 which are fixed to the roller cage 65 at diametrically spaced locations and which cooperate with the side gear 32 in a manner to be described. In addition to the above mentioned functions, the springs 86, 87 maintain the cage member 65 in spaced relation to the side gear 32 and carrier 11. The springs 86, 87 are generally arcuate members which are suitably connected intermediate their ends to the roller cage 65 at its left hand end as viewed in FIG. 1, such as by spot welding. Since the springs 86, 87 are identical in construction and function, only one spring, 86, will be described in detail herein.

The spring 86 includes an arcuate central portion 91 attached to the cage member 65 and arm portions 92, 93 which are spaced radially inwardly of the central portion and which extend radially inwardly and circumferentially of the cage member 65 with each arm including a bowed terminus 94 having a convex surface portion cooperating with grooves, or notches, 95 formed in the hub portion of the side gear 32. More particularly, the grooves or notches 95 are formed in the extreme left hand ends of certain of the grooves 60 in the hub portion 41. While the bowed end portions 94 are, in the preferred embodiment, formed by a shallow corrugation in the spring member, other constructions of the end portions can be satisfactorily utilized, for example, a solid bead of material having a convex surface can be affixed to the ends of the springs arms at their radially inner sides.

Figures 2, 3:
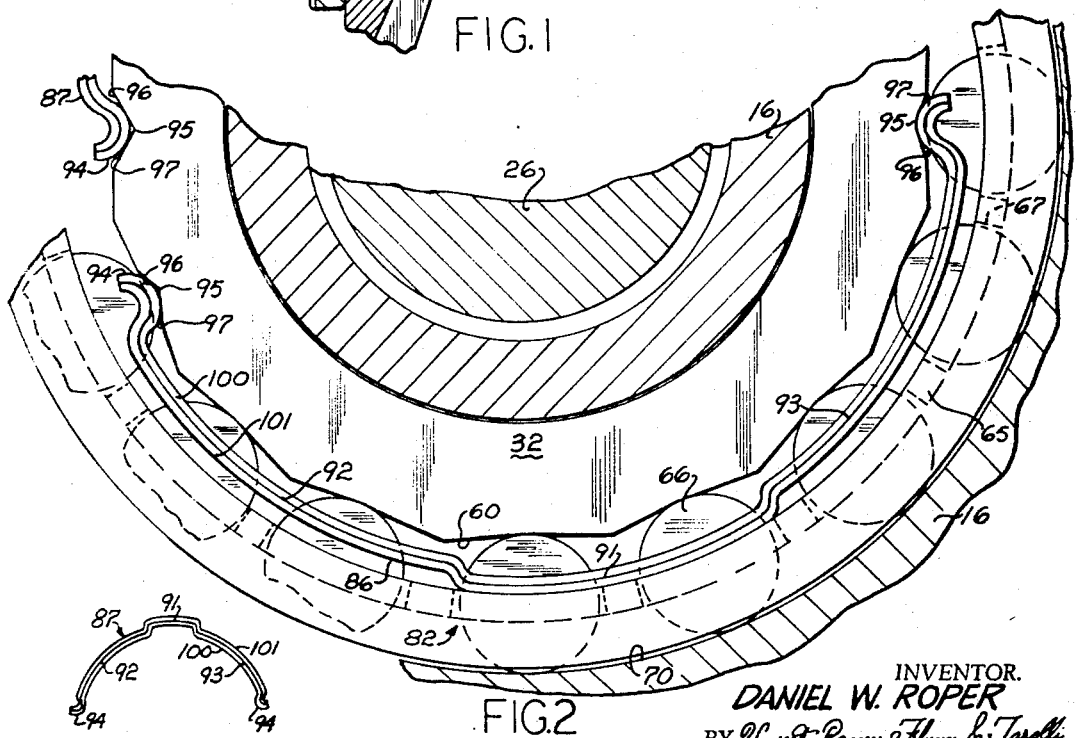
FIG. 2 is a fragmentary sectional view taken approximately at line 2—2 of FIG. 1.
FIG. 3 is an elevational view of a part of the drive mechanism of FIG. 1.

The arms 92, 93 of the spring 86 are tensioned so that the convex surfaces of the end portions 94 thereof are urged into engagement with surfaces 96, 97 of the notches 95 and upon shifting movement of the cage member 65 by the viscous coupling, the convex end portions of the spring arms move circumferentially relative to the surfaces of the notches so that the ends of the spring arms are cammed radially outwardly of the hub portion 41 along the sloping side surfaces 96, 97 of the notches. When the viscous shear actuating means 75 urges the cage 65 in a clockwise direction relative to the side gear 32, as viewed in FIG. 2, the bowed end portions 94 of the spring 86 are cammed radially outwardly of the side gear 32 along the surfaces 96 of the notches 95 when the biasing force of the spring is overcome. Conversely, movement of the cage member 65 in a counterclockwise direction, as viewed in FIG. 2, is resisted by the spring as the end portions 94 are cammed outwardly along the surfaces 97 of the notches 95. Since the arms of the spring member 86 are tensioned into engagement with the surfaces of the notches, the tension of each spring arm increases as the ends thereof are shifted along the sloping sides of the notches to thereby resist the shifting movement of the roller cage mechanism 51 by the viscous coupling.

It should be appreciated that the spring force which urges the arms 92, 93 of the spring toward engagement with the notches 95 in the hub portion 41 determines the biasing force which resists movement of the roller clutch mechanism 51 by the viscous coupling 75. When the speed of relative rotation between the carrier 11 and the side gear 32 reaches a predetermined speed the viscous fluid shear force overcomes the biasing force of the spring 86 and the roller cage mechanism 51 is moved circumferentially relative to the side gear 32 to drivingly connect the side gear 32 and the carrier 11 as described above. When torque is no longer being transmitted from the carrier 11 to the side gear 32, a slight torque reversal is effective to release the rollers so that the rollers are no longer wedged into engagement between the carrier and side gear and the means 82 effects returning movement of the roller cage mechanism 51 to its disengaged position wherein the side gear 32 is rotatable relative to the carrier 11. More particularly, the tension in the spring arms 92, 93 is effective to urge the convex end portions 94 thereof along either the surfaces 96 or the surfaces 97 of the notches 95 and toward the bottoms of the notches. Since the spring is fixed to the roller cage mechanism 51 and the roller cage mechanism is free to shift relative to the side gear 32, the roller cage mechanism is shifted by the spring force to move the rollers 66 toward their disengaged positions. When the bowed end portions of the spring 86 are bottomed in the notches 95, the roller cage mechanism 51 is maintained thereby in its disengaged position.

The spring 86 is constructed so as to provide a biasing force tending to maintain the roller cage mechanism 51 in its centered position and which spring force varies with temperature of the viscous shear fluid ambient thereto. To this end the spring 86 is constructed of laminations 100, 101 of spring material having dissimilar coefficients of thermal expansion and which laminations are connected to form a unitary spring structure. In the illustrated embodiment the radially inner lamination 100 has a coefficient of thermal expansion which is larger than the coefficient of thermal expansion of the radially outer lamination 101.

Upon a decrease in temperature of the shear fluid the inner lamination 100 contracts at a greater rate than the outer lamination 101 so that the spring force urging the convex end portions 94 of the spring arms toward the notches 95 increases to provide a relatively large force biasing the clutch means against engagement at low shear fluid temperatures. When temperature of the viscous shear fluid ambient the spring 86 increases, the inner lamination 100 of the spring expands at a greater rate than the outer lamination 101, tending to move the end portions of the spring arms away from the notches 95. Thus at relatively high shear fluid temperatures, the biasing force of the spring is reduced in magnitude in accordance with the reduction in viscosity of the shear fluid. Thus it can be seen that due to the bimetallic construction of the spring member 86, temperature related changes in viscosity of the shear fluid, which result in changes in the actuating force exerted upon the roller cage member 51 at a given speed of relative rotation between the carrier 11 and the side gear 32, are compensated for by the change in biasing force which resists the movement of the roller cage mechanism toward its engaged position. Thus the clutch 13 drivingly connects the carrier 11 and side gear 32 at substantially the same speed of relative rotation therebetween regardless of the temperature of the shear fluid.

It should be further noted that the springs 86, 87 are constructed so that at extremely low temperatures, when the viscosity of the shear fluid is high, the centering force exerted by the springs on the roller cage mechanism 51 is of such magnitude that the extremely high viscosity of the fluid in the gear chamber 19 is ineffective to provide an actuating force sufficient to lock up the differential. This construction prevents locking up of the differential mechanism during normal operation of the vehicle just after the vehicle has been started up in extremely cold weather, and under conditions wherein neither of the driving wheels of the vehicle have lost any substantial amount of traction. It should be recognized that after the vehicle has been operated for a relatively short time, the viscous shear fluid in the gear chamber 19 is heated, due to mechanical agitation thereof accompanying operation of the vehicle, so that the viscosity of the fluid decreases and a spring force exerted by the springs 86, 87 tending to resist engagement of the clutch means 13, decreases in relation to such decreases in shear fluid viscosity.

Having described my invention, I claim:

1. A drive mechanism comprising driving and driven members, clutch means located between said members and operable between a first condition wherein said members are free to rotate relative to each other and a second condition wherein relative rotation between said members is retarded, actuating means for operating said clutch means to said second condition in response to a predetermined speed of relative rotation between said members, and yieldable means opposing operation of said clutch means toward its second condition by said actuating means, said yieldable means including a spring member acting between said clutch means and one of said members and operable to apply a force to said clutch means which varies with temperature changes.

2. A drive mechanism as defined in claim 1 wherein said spring member is comprised of metallic materials having dissimilar coefficients of thermal expansion.

3. A drive mechanism as defined in claim 2 wherein said spring member includes a first portion fixedly secured to said clutch means and a second portion extending toward said one of said members, said second portion including a surface engageable with a cooperating surface on said one member and with said second portion urged toward engagement therewith.

4. A drive mechanism as defined in claim 2 wherein said spring member is arcuately configured and includes a central portion attached to said clutch means and arm portions extending oppositely from said central portion, and said arm portions including surfaces engageable with said one member and yieldably movable relative thereto in response to movement of said clutch means.

5. A drive mechanism as defined in claim 1 wherein said actuating means includes a fluid operated actuator and said spring member is disposed in heat exchange relationship to fluid associated with said actuating means, and the force applied to said clutch means by said spring member changes in response to temperature changes of said fluid.

6. A drive mechanism as defined in claim 5 wherein said spring member is a bimetallic spring member connected between said clutch means and said one of said members, said spring member cooperating with said clutch means and said one member to provide an increasing resistance to motion of said clutch means as the temperature of said fluid decreases.

7. A drive mechanism as defined in claim 6 wherein said clutch means includes a plurality of roller members positioned between said driving and driven members and a cage member surrounding one of said driving and driven members for maintaining said rollers in a predetermined spaced relationship to each other and for effecting simultaneous movement of said rollers relative to said driving and driven members, said spring member being connected to a peripheral portion of said cage member and extending therefrom toward engagement with a peripheral portion of said one member.

8. A drive mechanism comprising driving and driven members, clutch means for drivingly connecting said members and movable between a first position wherein said members are free to rotate relative to each other and a second position wherein said members are drivingly connected, actuating means for moving said clutch means to said second position at a predetermined speed of relative rotation between said members and spring detent biasing means for maintaining said clutch means in its first position at speeds of relative rotation between said members below said predetermined speed and for yieldably resisting movement of said clutch means toward said second position, said spring detent means including an arcuate spring member attached to a surface portion of said clutch means and cooperable with an adjacent surface on one of said members to exert a biasing force on said clutch means to urge said clutch means toward its first position.

9. A drive mechanism as defined in claim 8 wherein said clutch means includes a plurality of roller members disposed between said driving and driven members and an annular cage member between said driving and driven members for retaining said roller members in fixed relation to each other and for moving said roller members simultaneously relative to said driving and driven members, and said spring member including a central portion attached to said cage member and having oppositely extending arm portions cooperating with one of said driving and driven members to resist movement of said cage member relative to said one of said members.

10. A drive mechanism as defined in claim 9 wherein said spring member is connected to an inner peripheral portion of said cage member and said arm portions extend radially inwardly toward said driven member, and further including notches formed on an outer peripheral portion of said driven member cooperating with surfaces on said arm portions to maintain said cage member in a position wherein said driving and driven members are rotatable relative to each other, and with said notches and said surfaces of said spring member relatively movable to resist movement of said cage member relative to said driven member.

11. A drive mechanism as defined in claim 8 wherein said actuating means includes a viscous shear fluid coupling having a first shear surface connected to one of said driving and driven members and a second shear surface connected to said clutch means, said surfaces defining a viscous fluid shear space therebetween.

12. A drive mechanism comprising rotatable power input means, first and second driven output means, differential gear means for driving said first and second driven output means from said input means and providing a differential action between first and second driven output means, said differential gear means including first and second differential side gears drivingly connected to said first and second output means to effect rotation of said output means upon rotation of said side gears and a rotatable planet gear carrier drivingly connected with said output means and at least one planetary gear rotatably mounted on said planet gear carrier and meshing with said side gears to drive the same, clutch means operatively associated between spaced drive surfaces on said input means and one of said output means respectively, said clutch means being movable between an engaged position wherein said input and output means are drivingly connected and a disengaged position permitting relative rotation between said input and output means, and fluid operated actuating means operable to move said clutch means from its said disengaged position to its engaged position in response to a predetermined speed of relative rotation between said input means and one of said output means, and spring detent biasing means connected between said clutch means and one of said output means for maintaining said clutch means in its disengaged position at speeds of relative rotation below said predetermined speed and for yieldably resisting movement of said clutch means to its engaged position by said actuating means with the biasing force of said biasing means varying with temperature.

13. A drive mechanism as defined in claim 12 wherein said biasing means includes a bimetallic spring member operable to provide a biasing force which varies in response to temperature changes.

14. A drive mechanism as defined in claim 13 wherein said spring member is arcuately configured and attached to said clutch means, said spring member including portions cooperable with cam surfaces provided on a peripheral portion of one of said side gears adjacent said clutch means.

References Cited

UNITED STATES PATENTS

| | | |
|---|---|---|
| 1,872,986 | 8/1932 | Lane. |
| 2,320,900 | 6/1943 | Walz. |
| 3,228,494 | 1/1966 | Rumsey. |
| 3,324,744 | 6/1967 | Roper _____ 74—711 |

CARLTON R. CROYLE, *Primary Examiner.*

ALLAN D. HERRMANN, *Assistant Examiner.*

U.S. Cl. X.R.

192—35, 38, 82